United States Patent [19]

Theodore et al.

[11] Patent Number: 4,533,695

[45] Date of Patent: * Aug. 6, 1985

[54] NON-AQUEOUS DISPERSIONS BASED ON CAPPED STABILIZERS AND REACTANTS COMPRISING POLYFUNCTIONAL MONOMERS II

[75] Inventors: Ares N. Theodore, Farmington Hills; Mohinder S. Chattha, Livonia, both of Mich.

[73] Assignee: Ford Motor Company, Dearborn, Mich.

[ * ] Notice: The portion of the term of this patent subsequent to Jul. 9, 2002 has been disclaimed.

[21] Appl. No.: 455,696

[22] Filed: Jan. 5, 1983

[51] Int. Cl.$^3$ .......................... C08K 5/01; C08L 51/08
[52] U.S. Cl. .................................... 524/504; 524/923; 525/63; 525/278
[58] Field of Search ................. 525/278, 63; 524/923, 524/504, 505

[56] References Cited

U.S. PATENT DOCUMENTS

| | | | |
|---|---|---|---|
| 3,317,635 | 5/1967 | Osmond et al. | 525/296 |
| 3,514,500 | 5/1970 | Osmond et al. | 526/202 |
| 3,607,821 | 9/1971 | Franks et al. | 524/529 |
| 3,666,710 | 5/1972 | Makhlouf et al. | 524/461 |
| 3,686,111 | 8/1972 | Makhlouf et al. | 524/530 |
| 3,876,603 | 4/1975 | Makhlouf | 523/210 |
| 3,880,796 | 4/1975 | Christenson et al. | 524/461 |
| 3,966,667 | 6/1976 | Sullivan et al. | 524/474 |
| 4,025,474 | 5/1977 | Porter, Jr. et al. | 528/245.5 |
| 4,055,607 | 10/1977 | Sullivan et al. | 525/155 |
| 4,075,141 | 2/1978 | Porter, Jr. et al. | 524/56 |
| 4,115,472 | 9/1978 | Porter, Jr. et al. | 525/66 |
| 4,147,688 | 4/1979 | Makhlouf et al. | 524/461 |
| 4,180,619 | 12/1979 | Makhlouf et al. | 428/402 |
| 4,242,384 | 12/1980 | Andrew et al. | 427/421 |

FOREIGN PATENT DOCUMENTS 1156235 6/1969 United Kingdom .

OTHER PUBLICATIONS

Waite, *J. Oil Chem. Assoc.*, 1971, S4342-35Q, pp. 342-350.
Barrett, "Dispersion Polymerization in Organic Media, John Wiley & Sons, 1975, pp. 230-232.

*Primary Examiner*—Allan M. Liberman
*Attorney, Agent, or Firm*—Lorraine S. Melotik; Roger L. May

[57] ABSTRACT

Crosslinked, preferably acrylic, preferably melamine crosslinking, polymer particles characterized in that the particles are formed by reactions comprising free radical addition polymerization of:

(a) between about 0.5 and about 20 weight percent each of first and second monomers wherein said first monomer bears ethylenic unsaturation and functionality capable of crosslinking reaction with the other functionality present on the second monomer bearing multiple other functionalities and bearing no ethylenic unsaturation; and (b) between about 99 and about 60 weight percent of at least one other monoethylenically unsaturated monomer;

in the presence of (I) an organic liquid which is a solvent for the polymerizable monomers, but a non-solvent for the resultant polymer, and (II) polymeric dispersion stabilizer wherein the reaction is carried out at elevated temperatures such that the dispersion polymer forms and then is crosslinked. The stabilizer comprises the reaction product of an acrylic polymer-hydrocarbon molecule adduct having hydroxyl functionality with unsaturated monoisocyanate.

14 Claims, No Drawings

4,533,695

NON-AQUEOUS DISPERSIONS BASED ON CAPPED STABILIZERS AND REACTANTS COMPRISING POLYFUNCTIONAL MONOMERS II

Reference is made to commonly assigned related U.S. applications Ser. No. 455,687 entitled "Non-aqueous Dispersions Based on Capped Stabilizers and Vinyl Monomers II", Ser. No. 455,701 entitled "Non-aqueous Dispersions Based on Capped Stabilizers and Reactants Comprising Polyfunctional Monomers I", and Ser. No. 465,856, now U.S. Pat. No. 4,480,069 entitled "Non-aqueous Dispersions Based on Capped Stabilizers and Vinyl Monomers I", all to Theodore et al., and filed on Jan. 5, 1983. Further reference is made to commonly assigned related U.S. applications, Ser. No. 468,901, now abandoned, entitled "Preparation of Non-aqueous Dispersions with Use of Monofunctional Stabilizer" to Chattha et al. Ser. No. 468,902, now U.S. Pat. No. 4,493,914 entitled "Crosslinked Flow Control Additives for High Solids Paints II" to Chattha, and Ser. No. 468,912, entitled "Crosslinked Flow Control Additives for High Solids Paints I" to Cassatta et al, all filed Feb. 23, 1983.

TECHNICAL FIELD

This invention relates to stable, crosslinked polymer particles and non-aqueous dispersions containing such particles. More particularly, the invention relates to such stable crosslinked, preferably acrylic, preferably melamine crosslinked polymer particles prepared in the presence of a polymeric dispersion stabilizer which comprises the reaction product of an acrylic polymer-adduct having hydroxyl functionality with unsaturated monoisocyanates.

BACKGROUND ART

Suitable crosslinked acrylic polymer particles of the type which may employ the stabilizer of this invention are well known. U.S. Pat. No. 4,147,688 to Makhlouf et al teaches crosslinked dispersions wherein crosslinked acrylic polymer microgel particles are formed by free radical addition polymerization of alpha, beta ethylenically unsaturated monocarboxylic acids, at least one other copolymerizable monoethylenically unsaturated monomer and a certain percentage of crosslinking monomer, in the presence of a hydrocarbon dispersing liquid (See abstract, examples and claims). Other crosslinked dispersions containing microgel particles are disclosed in the patent application and patents referred to in the Makhlouf et al disclosure.

U.S. Pat. No. 4,025,474 to Porter et al discloses a polyester based coating composition which includes the crosslinked dispersions disclosed by Makhlouf et al. U.S. Pat. No. 4,075,141 to Porter et al discloses carboxylic acid amide interpolymer-based coating compositions including the same crosslinked dispersions. U.S. Pat. No. 4,115,472 also to Porter et al, discloses urethane coating compositions also including the crosslinked dispersions of Makhlouf et al. U.S. Pat. No. 4,055,607 to Sullivan et al discloses thermosetting compositions of (a) solution acrylic polymer, (b) at least 0.5% of microgel particles formed by polymerizing hydroxyl bearing monomers with monhydroxyl bearing monomers in the presence of the stabilizer disclosed by Makhlouf et al, and (c) melamine resin. The microgel dispersion of Sullivan et al thus contains functionality capable of reacting with the melamine crosslinking agent.

The dispersion stabilizer employed in producing the microgel particles of the Makhlouf et al compositions are generally polymeric and contain at least two segments, with one segment being solvated by the dispersion liquid and the second segment being of different polarity than the first segment, and relatively insoluble, compared to the first segment, in the dispersing medium. Included among the dispersion stabilizers referred to in the Makhlouf et al patent are polyacrylates and methacrylates, such as poly(lauryl)methacrylate and poly(2-ethylhexylacrylate); diene polymers and copolymers such as polybutadiene and degraded rubbers; aminoplast resins, particularly high naphtha-tolerant compounds such as melamine formaldehyde resins etherified with higher alcohols (e.g., alcohols having 4 to 12 carbon atoms); and various copolymers designed to have desired characteristics (see Col. 5, lines 1-27).

Among the numerous dispersion stabilizers which could be employed in compositions of Makhlouf et al are those taught by U.S. Pat. No. 3,607,821 to Clarke. Clarke teaches a stabilizer for nonaqueous dispersions wherein the stabilizer is chemically reacted with dispersed particles of the dispersion (Col. 1, lines 36-42). Each co-reactant stabilizer molecule forms from 1 to 10 (preferably 1 to 4) covalent links with the dispersed polymer (Col. 1, lines 50-52). The covalent links between the stabilizer and the dispersed polymer are formed by reaction between chemical groups provided by the stabilizer and complementary chemical groups provided by the dispersed polymer or by copolymerization reaction (Col. 1, lines 63-67).

Particularly preferred dispersion stabilizers of Makhlouf et al and the general type of stabilizer employed in the preparation of particles of this invention are those which are graft copolymers comprising two polymeric segments with one segment being solvated by the dispersion liquid and not associated with polymerized particles of the polymerizable ethylenically unsaturated monomers and the second segment being an anchor polymer of different polarity from the first type and relatively non-solvatable by the hydrocarbon solvent and capable of anchoring with the polymerized particles of the ethylenically unsaturated monomer. This anchor polymer segment contains pendant groups capable of copolymerizing with the ethylenically unsaturated monomer used to form the particles of the dispersion (See Col. 5, lines 28-40 of Makhlouf et al).

DISCLOSURE OF THE INVENTION

The crosslinked stable polymer particles of this invention are characterized in that the particles are formed by reactions comprising addition polymerization of (a) between about 0.5 and about 20 weight percent each of first and second monomers, wherein the first monomer bears ethylenic unsaturation and functionality capable of crosslinking reaction with the other functionality present on the second monomer bearing ;multiple other functionality and bearing no ethylenic unsaturation and (b) between about 99 and aboaut 60 weight percent of at least one other monoethylenically unsaturated monomer, in the presence of (I) organic liquid which is a solvent for the polymerizable monomers, but a non-solvent for the resultant polymer, and (II) a polymeric dispersion stabilizer. The crosslinked dispersion is prepared by carrying out the addition polymerization at an elevated temperature such that the dispersion polymer is first formed and then crosslinked.

In this invention the stabilizer employed in particle formation comprises the reaction product of:
(A) acrylic polymer-adduct having hydroxyl functionality and being the reaction product of:
  (a) long chain hydrocarbon molecules having only one reactive group preferably present as a pendant reactive group; and
  (b) acrylic polymer (i) having a number average molecular weight ($\overline{M}_n$) of between about 1000 and about 10,000, preferably between about 1000 and about 5000 and (ii) containing pendant functionality capable of reacting with the reactive group of the hydrocarbon molecule; and
(B) ethylenically unsaturated monoisocyanates.

The hydroxyl functionality on the acrylic polymer-adduct is either initially present on the acrylic polymer, generated in situ or both initially present and generated in situ. The long chain hydrocarbon molecules and the acrylic polymer are reacted in amounts so as to provide at least about 1.0 mole of hydrocarbon molecules for each mole of acrylic polymer, and the adduct and unsaturated isocyanates are reacted in amounts so as to provide between about 0.1 and about 1.0 reactive isocyanates for each hydroxyl functionality present on the adduct.

Preferably, the reactive group of (a) is carboxyl, the acrylic polymer contains pendant epoxide and hydroxyl functionality, and the monoisocyanates are monoethylenically unsaturated monomers having a terminal isocyanate group.

This invention is also directed to the dispersion comprising such particles, as well as coatings employing the particles of such dispersions.

One of the serious disadvantages of the aforementioned prior art systems of particle formation is the inherent restriction placed on the selection of suitable monomers which can be employed therein. This restriction results from the use of a first segment precursor which generally contains two different terminal functional groups, each of which is capable of reaction. Since it is desired therein to react only one of these groups, the selection of monomers meeting this condition is limited. Additionally, the presence of the unreacted terminal polar functional group on the first segment diminishes the desired non-polarity of this segment.

We have now found that by employing long chain hydrocarbon molecules having only one reactive group per molecule in accordance with the teachings of this invention, the aforementioned disadvantages can be effectively eliminated, thereby allowing the formation of a more distinctly non-polar first segment and the use of other preferred monomers such as isocyanates (both in stabilizer and particle formation) which advantageously offer more rapid, complete reactions and simpler process conditions.

Advantageously, the employment in stabilizer formation of acrylic polymers, rather than the series of monomers employed is prior art teachings and the unsaturated isocyanate results in simpler process conditions.

BEST MODE OF THE INVENTION

The polymeric dispersion stabilizer of the invention, as described above, comprises the reaction product of an acrylic copolymer-adduct having hydroxyl functionality with unsaturated monoisocyanates. The adduct is formed by reaction a long chain hydrocarbon molecules having only one reactive group with an acrylic copolymer, having pendant functionality capable of reacting with the reactive group of the hydrocarbon molecules. The hydrocarbon molecules and the acrylic polymers are reacted in amounts so as to provide at least 1.0 moles of such hydrocarbon molecules for each mole of acrylic polymer. By means of this reaction, an adduct having pendant hydrocarbon molecules and hydroxyl functionality is formed, wherein the hydroxyl functionality on the adduct is either initially present on the acrylic copolymer generated in situ on the adduct by means of this reaction, or both initially present and generated in situ. The reaction of the unsaturated monoisocyanate with the adduct by means of an isocyanate/hydroxyl reaction adds pendant ethylenic unsaturation on the anchor segment of the stabilizer, which pendant unsaturation is capable of copolymerizing with the ethylenically unsaturated monomers used to form the particles of the dispersion. The first segment portion of the stabilizer comprises the long chain hydrocarbon molecule which is solvated by the dispersing liquid.

This hydrocarbon molecule generally has a number average molecular weight ($\overline{M}_n$) in the range of between about 350 and about 3300. Included among such molecules, i.e., first segment precursors, are capped condensation polymers. The capped condensation polymer are obtained from uncapped polymers. Such uncapped polymers may be made, for example, by condensation reactions producing a polyester or polyether. The most convenient monomers to use are hydroxy acids or lactones. The hydroxy acids self-condense to form hydroxy acid polymers. In such cases, wherein the resultant polymer contains e.g., two different reactive groups per molecule, the polymers are subsequently capped, i.e., one of the two functional groups is reacted (blocked) so as to leave only one reactive group on the polymer. For example, a hydroxy fatty acid such as 12-hydroxystearic acid may be self-condensed to form poly(12-hydroxystearic acid), which is then capped by reaction with e.g., an alkyl monocarboxylic acid. In this embodiment, the carboxyl group of the alkyl monocarboxylic acid reacts with the hydroxyl group of the poly(acid) leaving only one reactive group, the carboxyl group, on the polymer. These reactions, the self-condensation and capping may be carried out in situ with singularly combined materials or in two steps as would be apparent to one skilled in the art.

Somewhat more complex, but still useful polyesters may be made by reacting diacids with diols. For example, 1,12-dodecanediol may be reacted with sebacic acid or its diacid chloride to form a component which could then be capped and employed as described above as the first segment.

As would be apparent to one skilled in the art, a variety of capping materials may be employed in the subject invention, whose selection would be dependent on the particular functional group to be capped. In the embodiment wherein poly(12-hydroxystearic acid) is employed and it is desired to react (cap) the terminal hydroxyl group, suitable capping material would include alkyl monocarboxylic acids and alkyl isocyanates, with aliphatic monocarboxylic acids being most preferred. The alkyl group of these capping materials is preferably selected from $C_3$–$C_{17}$ alkyl groups.

As discussed above, acrylic copolymer either includes hydroxy functionality initially, generates hydroxy functionality as a result of in situ reactions during adduct formation or both includes hydroxy functionality initially and generates it in situ. The acrylic copolymer has a number average molecular ($\overline{M}_n$) of between about 1000 and about 10,000, preferably between about 1000 and about 5000.

The acrylic copolymer may consist essentially of a copolymer which bears pendant hydroxyl functionality prior to adduct formation, which may be prepared by conventional free radical induced polymerization of suitable unsaturated monomers. In this instance, the term copolymer refers to a copolymer of two or more different monomers at least one of which contains pendant hydroxyl functionality. Preferably, the copolymer bearing hydroxyl functionality has a number average molecular weight of between about 1000 and about 5000. The monomers used to prepare such a hydroxy functional acrylic copolymer include between about 3 and about 30 weight percent of one or more monoethylenically unsaturated monomers bearing hydroxyl functionality.

The monoethylenically unsaturated hydroxy functional monomers useful in preparation of the copolymer and providing the hydroxy functionality to the copolymer may be selected from a long list of hydroxy functional monomers. Preferably, however, the hydroxy functional monomers are acrylates and may be selected from the group consisting of, but not linited to, the following esters of acrylic or methacrylic acids and aliphatic alcohols: 2-hydroxyethyl acrylate; 3-chloro-2-hydroxypropyl acrylate; 2-hydroxy-1-methylethyl acrylate; 2-hydroxypropyl acrylate; 3-hydroxypropyl acrylate; 2,3-dihydroxypropyl acrylate; 2-hydroxybutyl acrylate; 4-hydroxybutyl acrylate; diethylene glycol acrylate; 5-hydroxypentyl acrylate; 6-hydroxyhexyl acrylate; triethyleneglycol acrylate; 7-hydroxyheptyl acrylate; 2-hydroxymethyl methacrylate; 3-chloro-2-hydroxypropyl methacrylate; 2-hydroxy-1-methylethyl methacrylate; 2-hydroxypropyl methacrylate; 3-hydroxypropyl methacrylate; 2,3-dihydroxypropyl methacrylate; 2-hydroxybutyl methacrylate; 4-hydroxybutyl methacrylate; 3,4-dihydroxybutyl methacrylate; 5-hydroxypentyl methacrylate; 6-hydroxyhexyl methacrylate; 1,3-dimethyl-3-hydroxybutyl methacrylate; 5,6-dihydroxyhexyl methacrylate; and 7-hydroxyheptyl methacrylate.

Although one of ordinary skill in the art will recognize that many different hydroxyl bearing monomers, including those listed, above could be employed, the preferred hydroxy functional monomers for use in the copolymer of the invention are $C_5-C_7$ hydroxy alkyl acrylates and/or $C_6-C_8$ hydroxy alkyl methacrylates, i.e., esters of $C_2-C_4$ dihydric alcohols and acrylic or methacrylic acids. The remainder of the monomers forming the copolymer, i.e., between about 70 and about 97 weight percent of the monomers of the copolymer, are other monoethylenically unsaturated monomers. These monoethylenically unsaturated monomers are preferably alpha-beta olefinically unsaturated monomers, i.e., monomers bearing olefinic unsaturation between the two carbon atoms in the alpha and beta positions with respect to the terminus of an aliphatic carbon-to-carbon chain.

Among the alpha-beta olefinically unsaturated monomers which may be employed are acrylates (meaning ester of either acrylic or methacrylic acids) as well as mixtures of acrylates and vinyl hydrocarbons. Preferably, in excess of 50 weight percent of the total of the copolymer monomers are esters of $C_1-C_{12}$ monohydric alcohols and acrylic or methacrylic acids, i.e., methyl methacrylate, ethylacrylate, butylacrylate, butylmethacrylate, hexylacrylate, 2-ethylhexyl acrylate, laurylmethacrylate, etc. Among the monovinyl hydrocarbons suitable for use in forming the copolymers are those containing 8 to 12 carbon atoms and including styrene, alpha methylstyrene, vinyl toluene, t-butylstyrene and chlorostyrene. When such monovinyl hydrocarbons are employed, they should constitute less than 50 weight percent of the copolymer. Other monomers such as vinyl chloride, acrylonitrile, methacrylonitrile, and vinyl acetate may be included in the copolymer as modifying monomers. However, when employed, these modifying monomers should constitute only between about 0 and about 30 weight percent of the monomers in the copolymer. Small amount of ethylenically unsaturated carboxylic acids can also be used in preparing the copolymer, such as acrylic acid, methacrylic acid, crotonic acid, itaconic acid, maleic acid and the like.

In those embodiments employing an acrylic polymer having only hydroxyl functionality, the long chain hydrocarbon molecule and the hydroxy functional acrylic copolymer are reacted in amounts which allow reaction of at least one but not all of the hydroxyl groups present on the copolymer. At least one hydroxyl must be present on the adduct and available for reaction with the ethylenically unsaturated monoisocyanate (B).

As mentioned above, the acrylic copolymer may contain both hydroxyl functionality and functionality which reacts in situ to form hydroxyl functionality. Exemplary of one such copolymer would be that bearing both hydroxyl and epoxide functionality, the epoxide functionality capable of reacting with, e.g., a carboxyl functionality to generate a hydroxyl group which may thereafter also react with the unsaturated monoisocyanate. Such a bifunctional acrylic copolymer i.e., bearing pendant epoxide and hydroxyl groups may be prepared by free radical induced polymerization of suitable unsaturated monomers and preferably have a number average molecular ($\overline{M}_n$) of between about 1000 and about 5000. These copolymers are those formed from two or more different monomers at least one of which contains pendant epoxide functionality and at least one of which contains pendant hydroxyl functionality. The monomers used to prepare the copolymer include between about 2.5 and about 25 weight percent of one or more glycidyl esters of a monoethylenically unsaturated carboxylic acid, e.g., glycidyl acrylate and glycidyl methacrylate. These monomers provide the monomer with its epoxide functionality. The monomers used to prepare this epoxide functional hydroxyl functional acrylic copolymer also include one or more monoethylenically unsaturated monomers bearing hydroxyl functionality such as those described above. The hydroxy monomers used to prepare the glycidylhydroxy copolymers include between about 0.5 and about 10 weight percent of one or more hydroxy esters such as hydroxy ethyl acrylate and hydroxy ethyl methacrylate. The remainder of the monomers in the copolymer, i.e., between about 65 and about 97 weight percent, consist of other monoethylenically unsaturated monomers, such as those described above.

As mentioned previously, the acrylic copolymer may consist essentially of a copolymer which reacts in situ to form hydroxyl functionality, i.e., a compound not initially including hydroxyl functionality. Such a copolymer could be, for example, a copolymer as those described above, but bearing only epoxide functionality.

Such a copolymer bearing epoxide functionality would preferably have a number average weight ($\overline{M}_n$) of between about 1000 and about 5000, and be formed by free radical induced polymerization of suitable unsaturated monomers, at least one of which contains pendant epoxide functionality, such as those described above. The monomers used to prepare the epoxide functional acrylic copolymer include between about 3 and about 30 weight percent of one or more monoethylenically unsaturated monomers bearing epoxide functionality and the remainder of the monomers in the epoxide containing copolymer, i.e., between about 70 and about 98 weight percent, consists of other monoethylenically unsaturated monomers, such as those discussed above.

In those embodiments wherein the acrylic copolymer contains either epoxide or epoxide and hydroxyl functionality, the long chaim hydrocarbon molecule and the copolymer are reacted in amounts sufficient to provide at least one such hydrocarbon molecule per mole of acrylic copolymer, however they may be reacted in amounts so as to provide up to about 1.0 long chain hydrocarbon molecules per each epoxide group present on the acrylic copolymer.

In preparing these acrylic copolymers, the hydroxy and/or epoxide functional monomers and the remaining monoethylenically unsaturated monomers are mixed and reacted by conventional free radical initiated polymerization in such proportions as to obtain the copolymer desired. A large number of free radical initiators are known to the art and are suitable for the purpose. These include: benzoyl peroxide; lauryl peroxide; 1-butylhydroxy peroxide; acetylcyclohexylsulfonyl peroxide; diisobutyryl peroxide; di(2-ethylhexyl)peroxydicarbonate; diisopropylperoxydicarbonate; t-butylperoxypivalate; decanoyl peroxide; azobis(2-methyl-propionitrile), etc. The polymerization is preferably carried out in solution using a solvent in which the copolymer is soluble. Included among the suitable solvents are toluene, xylene, dioxane, butanone, butyl acetate and methyl amyl ketone, etc. If the copolymer is prepared in solution, the solid copolymer can be precipitated by pouring the solution at a slow rate into a nonsolvent for the copolymer such as hexane, octane, or water under suitable agitation conditions.

The copolymer useful in the compositions of this invention can also be prepared by emulsion polymerization, suspension polymerization, bulk polymerization, or combinations thereof, or still other suitable methods. In these methods of preparing copolymers, chain transfer agents may be required to control molecular weight of the copolymer to a desired range. When chain transfer agents are used, care must be taken so they do not decrease the shelf stability of the composition by causing premature chemical reactions.

Preferred of the acrylic copolymers taught above for use in this invention are copolymers containing (i) epoxide functionality and (ii) epoxide functionality and hydroxyl functionality, with copolymers containing both epoxide functionality and hydroxyl functionality being most preferred.

The unsaturated isocyanate useful in the stabilizer formation for the particles of this invention comprises ethylenically unsaturated monoisocyanates, i.e., containing one reactive isocyanate functional group per molecule and containing ethylenic unsaturation. Preferably, they are monoethylenically unsaturated isocyanates and most preferably contain alpha-beta monoethylenic unsaturation, i.e., bear olefinic unsaturation between the two carbon atoms in the alpha-beta positions with respect to the terminus of an aliphatic carbon-to-carbon chain. Exemplary of such isocyanates which may be employed in the stabilizer formation of the invention of this application are isocyanatoethyl methacrylate, the reaction product of isophone diisocyanate (IPDI) and hydroxyethyl or hydroxypropyl methacrylate, and the reaction product of (IPDI) and acrylic or methacrylic acid (1:1 molar ratio), with isocyanatoethyl methacrylate being preferred.

The acrylic copolymer adduct and the monoethylenically unsaturated isocyanates are reacted in amounts so as to provide between about 0.1 and about 1.0, more preferably between about 0.2 and about 0.8 reactive isocyanates per each hydroxyl functionality present in said acrylic polymer adduct (A).

In one preferred embodiment of stabilizer formation, hydroxystearic acid is self-condensed to form poly(12-hydroxystearic acid), a linear polyester having a terminal carboxyl group on one end and a terminal hydroxy group on the other, which is subsequently capped by reaction with an alkyl monocarboxylic acid, e.g., stearic acid; (alternately, the capped poly(12-hydroxystearic acid) can be prepared in one step by combining all ingredients and allowing them to react. The capped polyacid is then preferably reacted with an acrylic copolymer containing hydroxy and epoxide functionality. The terminal carboxyl of the capped hydroxy-acid reacts with the epoxide of the copolymer to form an ester linkage and generates additional hydroxyl functional groups. This adduct is then reacted with isocyanatoethyl methacrylate, wherein by means of isocyanate/hydroxy reactions a graft copolymer with vinyl groups or "hooks" extending from the acrylic copolymer backbone is formed. (Optionally, pendant groups, i.e., hydroxyl may also be present).

As discussed above, the polymeric dispersion stabilizer of the crosslinked dispersions to which this invention applies are generally those containing at least two segments, with one segment being solvated by the dispersing liquid and the other being of different polarity than the first segment and relatively insoluble in the dispersing liquid. The dispersion stabilizer is a graft copolymer containing two polymeric segments with one segment being solvated by the dispersing liquid and the second segment being an anchor polymer of different polarity than the first segment and relatively non-solvatable by the dispersing liquid. Such preferred polymeric dispersion stabilizers contain pendant groups (e.g., ethylenic unsaturation and hydroxyl) on the anchor polymer which may react with the ethylenically unsaturated monomers in the copolymerization process used to make the crosslinked dispersed particles. Preferably such chemical reaction is by way of addition copolymerization with the ethylenically unsaturated monomers used in the preparation of the crosslinked particles through ethylenic unsaturation on the anchor segment of the polymeric dispersion stabilizer, however such reaction may include that between other reactive groups respectively present on the particle monomers and anchor polymer.

The particles are prepared using the stabilizer in a manner which is similar to well known nonaqueous dispersion processing.

In forming the dispersion, the dispersion stabilizer is generally employed in an amount of between about 1 and about 30 weight percent based on the weight of the monomers used to form the particles.

The crosslinked particles to which the particular stabilizer of this invention applies are prepared by addition polymerization of (a) between about 0.5 and about 20 weight percent each of first and second monomers, wherein the first monomer bears ethylenic unsaturation and functionality capable of crosslinking reaction with the other functionality present on the second monomer bearing multiple such other functionality and bearing no ethylenic unsaturation and (b) between about 99 and about 60 weight percent of at least one other monoethylenically unsaturated monomer. The second monomer bears multiple other functionality, i.e., having two or more, preferably three of such other functionalities capable of crosslinking reaction with reactive functionality on the first monomer. The addition polymerization is carried out in the presence of an organic liquid which is a solvent for the polymerizable monomers, but a nonsolvent for the resultant polymer and in the presence of the aforementioned polymeric dispersion stabilizer.

The crosslinking functionalities on the first and second monomers (a) in this type of particle formation can be selected from a wide variety of functionalities which will be apparent to those skilled in the art. Among the preferred pairs of crosslinking functionalities which may be present on the first and second monomers are: hydroxyl and isocyanate; acid and epoxide; epoxide and amine; hydroxyl and amine; acid anhydride and mercaptan; hemiformal and amide; carbonate and amine; cycloimide and amine; cycloimide and hydroxyl; imine and alkoxysilane; etc.

Optionally, in addition to the first and second monomers or as a replacement for a portion of the first and/or second monomers employed in particle formation, a minor amount of other suitable first and/or second monomers from those described above may be employed, as would be apparent to one skilled in the art.

While the first ethylenically unsaturated monomers of the first and second monomers (a) may be any ethylenically unsaturated monomer within the scope of such term (i.e., any monomer which bears ethylenic unsaturation), it is preferred that the monomers be acrylic monomers (i.e., monomers based on acrylic, methacrylic or ethacrylic acids).

Exemplary of such first and second monomers which may be employed in particle formation, but are not limited to, hydroxy unsaturated monomers and multifunctional amines, e.g., hydroxyethyl methacrylate and melamine resins; hydroxy unsaturated monomers and multifunctional isocyanates, e.g., hydroxy ethyl methacrylate and tri-isocyanates; unsaturated acid monomer and polyfunctional epoxides, e.g., methacrylic acid and diepoxides; unsaturated epoxy monomers and polyacids, e.g., glycidyl methacrylate and azelaic acid; etc. One particular preferred embodiment of the first and second monomers employed to form the particle are hydroxyethyl methacrylate and melamine resins.

Various other monoethylenically unsaturated monomers may be copolymerized with the monomers in the preparation of this class of crosslinked dispersion. Although essentially any copolymerizable monoethylenically unsaturated monomer may be utilized, depending upon the properties desired, the preferred monoethylenically unsaturated monomers are the alkyl esters of acrylic or methacrylic acid, particularly those having about 1 to about 4 carbons in the alkyl group. Representative of such compounds are alkyl acrylates, such as methacrylate, ethyl acrylate, propyl acrylate and butyl acrylate and the alkyl methacrylates, such as methyl methacrylate, ethyl methacrylate, propyl methacrylate and butyl methacrylate. Other ethylenically unsaturated monomers which may be advantageously employed include, for example, the vinyl aromatic hydrocarbons, such as styrene, alpha-methyl styrene, vinyl toluene, unsaturated esters of organic and inorganic acids, such as vinyl acetate, vinyl chloride and the like, and the unsaturated nitriles, such as acrylonitrile, methacrylonitrile, ethacrylonitrile and the like.

A preferred embodiment of crosslinked polymer particles within the scope of the invention is formed by reactions comprising free radical addition copolymerization, in the presence of the dispersion stabilizer and in the presence of a hydrocarbon dispersing liquid, of from about 0.5 to about 20, preferably from about 2 to about 10 weight percent of ethylenically unsaturated hydroxy monomers, from about 0.5 to about 20 weight percent, preferably from about 2 to about 10 weight percent of a crosslinking monomer selected from the group consisting of amine-aldehyde resins, and from about 99 to about 60, preferably from about 96 to about 90 weight percent of at least one other copolymerizable monoethylenically unsaturated monomer.

The preferred ethylenically unsaturated hydroxy monomers for use in these crosslinked dispersions are hydroxy functional acrylates and methacrylates, such as those described above for copolymer formation, with methacrylates being especially preferred.

Amine-aldehyde crosslinking resins suitable for crosslinking hydroxy functional bearing materials are well known in the art. Typically, these crosslinking materials are products of reactions of melamine, or urea with formaldehyde and various alcohols containing up to and including 4 carbon atoms. Preferably, the amine-aldehyde crosslinking agents useful in this invention in particle formation are condensation products of formaldehyde with melamine, substituted melamine, urea, benzoguanamine or substituted benzoquanamine. Preferred members of this class useful in the particle formation of this invention with hydroxy functional ethylenically unsaturated monomers are methylated melamine-formaldehyde resins such as hexanethoxymelamine.

Particularly preferred crosslinking agents for particle formation employing hydroxyl functional monomers are the amino crosslinking agents sold by American Cyyanamid under the trademark "Cymel". In particular, Cymel 301, Cymel 303 and Cymel 325 which are alkylated melamine-formaldehyde resins, are useful in the particle formation of this invention. The particles of this invention can be left as dispersions in the solvent employed in particle formation or the solvent employed in particle formation can be removed, leaving the particles in a powder form. These particles, when present as a dispersion in the solvent or as a dry powder, can be employed as flow control agents in liquid system coatings, for example, in such as those taught in U.S. application Ser. No. 334,683, now U.S. Pat. No. 4,376,187, to Chattha and Theodore and Nos. 334,685, now abandoned, and 334,799, now U.S. Pat. No. 4,424,334, all filed Dec. 28, 1981. The powdered particles formed according to this invention have also been found useful as flow control agents in powder coatings.

Industrial Applicability

It should be apparent from the foregoing, that the particles of this invention find application in coatings as, for example, flow control agents.

In view of the disclosure, many modifications of this invention will be apparent to those skilled in the art. It is intended that all such modifications which fall within the true scope of this invention be included within the terms of the appended claims.

The following examples are presented by way of description of the composition of the invention and set forth to best mode contemplated by the inventors but are not to be construed as limiting.

EXAMPLE 1

Capped poly(12-hydroxystearic acid) 12-hydroxystearic acid (2410.00 g) and xylene (500.00 g) were heated to obtain a solution. Tetraisopropyl titanate (1.50 g, Tyzor TPT, Dupont) was added to the solution and refluxed for 30 hours under a Dean-Stark water separator to collect 106.00 g water. Fifty grams of stearic acid were added to the reaction mixture and refluxing was continued for ten hours until no more water was collected. Infrared spectrum of product showed complete disappearance of hydroxy absorption band. The molecular weight ($\overline{M}_w/\overline{M}_n$) of product was 4195/2110=1.99.

Preparation of Stabilizer A monomer mixture (250.00 g glycidyl methacrylate, 100.00 g hydroxyethyl methacrylate, and 650.00 g methyl methacrylate) and 40.00 g 2,2'-azobis(2-methyl propionitrile) (AIBN) were combined and added dropwise to the refluxing solvent (300.00 g butyl acetate and 120.00 g xylene) in four hours under a nitrogen atmosphere. After the addition was complete, 1 g AIBN was added to the reaction mixture. The polymer molecular weight ($\overline{M}_w/\overline{M}_n$) is 5630/3010=1.87.

The above copolymer solution (500.00 g) was combined with capped poly(12-hydroxystearic acid) (1000.00 g), Cordova catalyst AMC TM-2 (2.00 g), naphtha (400.00 g) and butyl acetate (200.00 g). The mixture was heated at 75° C. for 3 hours with stirring. A solution (15.00 g isocyanatoethyl methacrylate, 0.25 g dibutylin dilaurate, 1.50 g hydroquinone and 100.00 g butyl acetate) were added to the above mixture and it was stirred for five hours at 75° C. The disappearance of isocyanate and glycidyl groups indicated completion of reactions for formation of stabilizer.

Preparation of Nonaqueous Dispersion: In a four-liter flask equipped with a condenser, gas inlet tube, thermometer, sample port and mechanical stirrer was charged 700.00 g heptane. To the boiling heptane were added stabilizer (6.20 g), methyl methacrylate (30.00 g) and AIBN (2.00 g). After refluxing the reaction mixture for 30 minutes, the following mixture was added dropwise over a period of 4 hours under a nitrogen atmosphere: stabilizer (110.00 g), methyl methacrylate (670.00 g), Cymel 301 (40.00 g) hydroxyethyl methacrylate (40.00 g), aliphatic hydrocarbon (270.00 g, b.p. 127°–140° C.), 1-octanethiol (6.00 g) and AIBN (3.00 g) phenyl acid phosphate (4.00 g, 40% solution in isopropanol). After completion of monomer addition, 0.40 g AIBN in 5.00 g butyl acetate were added. The dispersion was refluxed for 2.5 additional hours. Solids content was 45.90%, average particle size approximately 0.30 μm and viscosity at 25° C. was 9.7 sec. (Ford cup #4).

The dispersed particles were combined with the following ingredients in preparing a coating formulation:

| | |
|---|---|
| 1. Tetrahydroxy oligomer (90% solids, $M_n$ = 800), | 130.00 g |
| 2. Cymel 325 (80% solids) | 50.00 g |
| 3. Dispersed particles (44.90 solids) | 21.00 g |
| 4. Phenyl acid phosphate (40% in isopropanol) | 2.80 g |
| 5. Methyl amyl ketone-butyl acetate (1:1 by weight) | 58.00 g |

This coating composition exhibited excellent flow control during application and baking at 130° C. for 20 minutes. In the absence of dispersed particles, the flow control of this coating composition was poor.

EXAMPLE 2

The procedures of Example 1 were repeated with exception that the stabilizer was prepared by combining the hydroxy-epoxy copolymer solution (500.00 g, $M_n$=3000) with capped poly(12-hydrostearic acid) (115.00 g), Cordova catalyst AMC TM-2 (2.10 g), isocyanatoethyl methacrylate (20.00 g), dibutylin dilaurate (0.25 g), hydroquinone (1.70 g), naphtha (400.00 g) and butyl acetate (320.00 g). After heating the mixture at 70° C. for 10 hours, the isocyanate and epoxy groups disappeared almost completely. This stabilizer was employed in preparing the nonaqueous dispersions as in Example 1.

A coating formulation was prepared by combining the following ingredients:

| | |
|---|---|
| 1. Tetrahydroxy oligomer (90% solids, $M_n$ = 800) | 60.00 g |
| 2. Cymel 325 (80% solids) | 21.00 g |
| 3. Dispersed particles (45.10% solids) | 12.50 g |
| 4. Phenyl acid phosphate (40% in isopropanol) | 1.70 g |
| 5. Methyl amyl ketone-butyl acetate (1:1) | 30.00 g |

The above coating formulation exhibited no sagging after spraying and during curing at 130° C. for 20 minutes. The cured films had good properties.

EXAMPLE 3

The following monomer mixture was added dropwise to the refluxing solvent (300.00 g butyl acetate and 120.00 g xylene) in 4 hours under a nitrogen atmosphere:

| Ingredient | Amount, g |
|---|---|
| 1. Glycidyl methacrylate | 250.00 g |
| 2. Methyl methacrylate | 700.00 g |
| 3. Hydroxyethyl methacrylate | 50.00 g |
| 4. 2,2'-azobis (2-methyl-propionitrile) | 40.00 g |

After completing the addition of monomers, 0.50 g AIBN in 4.00 g butyl acetate was added to the reaction mixture and it was refluxed for 1.5 additional hours. The polymer molecular weight was ($\overline{M}_w/\overline{M}_n$) 5675/3020=1.88.

The above epoxy-hydroxy copolymer (500.00 g) was combined with capped poly(12-hydroxystearic acid) (1080 g, Example 1), Cordova catalyst AMC TM-2 (2.00 g), isocyanatoethyl methacrylate (10.00 g), dibutylin dilaurate (0.20 g), hydroquinone (1.50 g), naphtha (400.00 g) and butyl acetate (320.00 g). The mixture was heated at 70° C. for 8 hours and the isocyanate and epoxy groups disappeared almost completely.

The above stabilizer (4.20 g) was combined with methyl methacrylate (14.00 g) and AIBN (1.00 g) and added to 340.00 g of boiling heptane. After refluxing the reaction mixture for 30 minutes, the following monomer was added dropwise over a period of 3.5 hours under a nitrogen atmosphere: stabilizer (70.00 g), methyl methacrylate (200.00 g), styrene (150.00 g), Cymel 301 (20.00 g), hydroxyethyl methacrylate (18.00 g), aliphatic hydrocarbon (140.00 g) b.p. 127°–140° C.), 1-octanethiol (3.60 g) and AIBN (1.50 g). 0.2 g AIBN in 4.0 g butyl acetate were added to the dispersion and it was refluxed for one additional hour. The dispersed particles were stable.

The above dispersion was combined with the coating ingredients as in Example 1. The coating formulation had good flow control and the cured films had good properties.

EXAMPLE 4

A monomer mixture (80 g glycidyl methacrylate, 850.00 g methyl methacrylate, 70.00 g hydroxyethyl methacrylate) was combined with 39.00 g 2,2'-azobis(2-methyl propionitrile) and added dropwise to the refluxing solvent (290.00 g butyl acetate and 130.00 g xylene) in four hours under a nitrogen atmosphere. After completion of addition of monomers, 0.70 g AIBN in 3.00 g butyl acetate was added to the reaction mixture and it was refluxed for 1 additional hour.

Five hundred grams of above epoxy-hydroxy copolymer were combined with 380.00 g capped poly(12-hydroxystearic acid) (Example 1), Cordova catalyst AMC TM-2 (2.00 g), isocyanatoethyl methacrylate (7.00 g), dibutyltin dilaurate (0.20 g), hydroquinone (1.30 g), naphtha (350.00 g) and butyl acetate (310.00 g). The mixture was heated at 75° C. until the isocyanate and epoxy groups disappeared almost completely. This stabilizer was employed to prepare dispersions as in Example 3. Coatings containing these particles exhibited good flow control and the resulting films had good physical properties.

EXAMPLE 5

The preparation of capped poly(12-hydroxystearic acid) was carried out as in Example 1. A monomer mixture (800.00 g) methyl methacrylate, 200.00 g hydroxyethyl methacrylate and 38.00 g AIBN) was added to 450.00 g of refluxing xylene dropwise. After adding the monomers over three hours, 0.20 g AIBN in 3.00 g butyl acetate were added and refluxing continued for one additional hour. The polymer molecular weight ($\overline{M}_w/\overline{M}_n$) was 5885/3095=1.90.

The above hydroxy copolymer (600.00 g) was combined wih capped poly(12-hydroxystearic acid) (1080.00 g) and tetraisopropyl titanate (1.90 g) and was refluxed under a Dean-Stark water separator until no more water was distilling over. The mixture was cooled to 65° C. A solution (10.00 g isocyanatoethyl methacrylate, 0.20 g dibutyltin dilaurate, 1.50 g hydroquinone, 350.00 g naphtha and 250.00 g butyl acetate) was added to the above mixture over a period of two hours with stirring. The solution was stirred at 65° C. for six additional hours. This stabilizer was used to prepare dispersions as in Example 1.

The dispersed particles were combined with the coating ingredients as in Example 1. The resulting coatings had good flow control. After baking at 130° C. for 20 minutes, the cured films had good properties.

EXAMPLE 6

Example 5 was repeated with the single exception that 40.00 g Cymel 303 were used for crosslinking with the hydroxyethyl methacrylate. The dispersion was prepared as in Example 5. Coatings containing these particles and the other ingredients as in Example 1 exhibited good flow control.

EXAMPLE 7

The procedures of Example 6 was repeated with the exception that 850.00 g capped poly(12-hydroxystearic acid) were employed in the preparation of stabilizer. Coatings containing the particles stabilized by this stabilizer had good properties.

EXAMPLE 8

Example 1 is repeated with the exception that in the preparation of dispersion Cymel 301 was replaced with an equal amount of Cymel 325. The dispersions were stable.

EXAMPLE 9

The procedures of Example 8 were repeated with the exception that in the preparation of dispersion 7.00 g hydroxyethyl methacrylate was replaced with an equal amount of glycidyl methacrylate.

EXAMPLE 10

A glycidyl acrylic copolymer was prepared by adding dropwise a monomer mixture (790.00 g methyl methacrylate, 210.00 g glycidyl methacrylate and 36.00 g AIBN) to refluxing solvent blend (300.00 g xylene and 150.00 g butyl acetate) for four hours under a nitrogen atmosphere. After completion of monomer addition, 0.30 g AIBN in 4.00 g butyl acetate were added and refluxing continued for 1 additional hour. The polymer molecular weight ($\overline{M}_w/\overline{M}_n$) was 5850/2990=1.96.

Five hundred grams of above epoxy copolymer were combined with 800.00 g capped poly(12-hydroxystearic acid) (Example 1), Cordova catalyst AMC TM-2 (2.00 g), naphtha (350.00 g) and butyl acetate (200.00 g). The mixture was stirred at 90° C. for three hours. A solution (10.00 g isocyanatoethyl methacrylate, 0.20 g dibutyltin dilaurate, 1.50 g hydroquinone and 100.00 g butyl acetate were added to the above mixture and it was stirred for 8 more hours. This stabilizer was employed in preparation of dispersions as in Example 1. Coatings containing these particles as in Example 1 had good flow properties.

EXAMPLE 11

Example 10 was repeated with the single exception that in the preparation of dispersion 8.00 g hydroxyethyl methacrylate was replaced with an equal amount of methacrylic acid. The resulting particles were stable and controlled the flow of coating compositions.

EXAMPLE 12

The stabilizer was prepared as in Example 1 but the reactive monomers used to prepare the crosslinked particles were different. To boiling heptane (390.00 g) the followin mixture of ingredients was added dropwise over a period of 3 hours under a nitrogen atmosphere:- stabilizer (Example 1, 200.00 g), methyl methacrylate (223.00 g), butyl methacrylate (55.00 g), styrene (110.00 g), glycidyl methacrylate (20.00 g), azelaic acid (14.00 g), 1-octanethiol (3.60 g), aliphatic hydrocarbon (140.00 g, b.p. 127°–140° C.), dimethyl-dodecyl amine (1.00 g) and AIBN (1.50 g). After completing the monomer addition, 0.3 g AIBN in 4.00 g butyl acetate were added and refluxing continued for 2 hours. Solids content was 44.9%, average particle size 0.26 μm and viscosity at 25° C. was 9.6 sec. (Ford cup #4).

The crosslinked, dispersed particles were combined with the following ingredients to obtain a coating composition:

| | | |
|---|---|---|
| 1. Acrylic hydroxy copolymer (30% hydroxy monomer, $\overline{M}_n$ = 1850 and 80% solids) | 150.00 g | |
| 2. Cymel 325 (80% solids) | 47.00 g | |
| 3. Dispersed particles (44.90% solids) | 28.00 g | |
| 4. Phenyl acid phosphate (40% in isopropanol) | 4.00 g | |
| 5. Methyl amyl ketone | 75.00 g | |

This composition was applied on primed panels and exhibited no sagging during application and curing at 130° C. for 25 minutes.

EXAMPLE 13

The procedures of Example 1 were repeated with the exception that in the preparation of dispersion Cymel 301 (40.00 g) was replaced by an equal amount of isophorone diisocyanate. The dispersion was stable and controlled the flow of high solids coatings.

EXAMPLE 14

The procedures of Example 1 were repeated with the exception that other reactive monomers were employed in preparing the crosslinked particles. To boiling naphtha (380.00 g, b.p. 120°–140° C.) the following mixture of ingredients were added dropwise over a period of 3 hours under a nitrogen atmosphere. Stabilizer (70.00 g, Example 1), methyl methacrylate (340.00 g), methacrylic acid (15.00 g), 1,4-butanediol diglycidyl ether (18.00 g), 1-octanethiol 3.50 g), dimethyl dodecyl amine (1.00 g), naphtha (140.00 g, b.p. 120°–140° C.) and AIBN (1.50 g). 0.4 g AIBN in 4.00 g butyl acetate were added and the dispersion was refluxed for 3 additional hours. The particles (average particle size 0.31 μm) were stable and controlled the flow of paint compositions during application and early baking stages.

EXAMPLE 15

Example 1 is repeated with the exception of the acrylic hydroxy-epoxy copolymer used for preparing the stabilizer. A monomer mixture (210.00 g glycidyl methacrylate, 70.00 g hydroxyethyl methacrylate, and 720.00 g methyl methacrylate) and 30.00 g AIBN were combined and added dropwise to the refluxing solvent (300.00 g butyl acetate and 120.00 g xylene) in four hours under a nitrogen atmosphere. At the completion of the monomer addition, 1.00 g AIBN was added to the reaction mixture and it was refluxed for two additional hours. The polymer molecular weight ($\overline{M}_w/\overline{M}_n$) is 7020/3700=1.9. The above copolymer was used to prepare the stabilizer which was employed in preparing the dispersion as in Example 1. Coatings containing these dispersions as in Example 1 had good flow properties.

In view of the disclosure, many modifications of this invention will be apparent to those skilled in the art. It is intended that all such modifications which fall within the true scope of this invention be included within the terms of the appended claims.

We claim:

1. A stable dispersion containing crosslinked polymer particles characterized in that said particles are formed by reactions comprising addition polymerization of:
   (a) between about 0.5 and about 20 weight percent each of first and second monomers wherein said first monomer bears ethylenic unsaturation and functionality capable of crosslinking reaction with other functionality present on said second monomer, said second monomer bearing at least two functional groups of said other functionality and bearing no ethylenic unsaturation; and
   (b) between about 99 and about 60 weight percent of at least one other monoethylenically unsaturated monomer;

in the presence of (I) an organic liquid which is a solvent for the polymerizable monomers, but a non-solvent for the resultant polymer, and (II) polymeric dispersion stabilizer, wherein the reaction is carried out at elevated temperatures such that the dispersion polymer first forms and then is crosslinked, and wherein said stabilizer comprises the reaction product of:

(A) acrylic polymer-adduct having hydroxyl functionality and being the reaction product of:
      (a) long chain hydrocarbon molecules having only one reactive group; and
      (b) acrylic polymer (i) having a number average molecular weight of between about 1000 and about 10,000 and (ii) containing pendant functionality capable of reacting with said reactive group of said hydrocarbon molecule;

wherein said hydroxyl functionality on said acrylic polymer-adduct is either initially present on said acrylic polymer, generated in situ, or both initially present and generated in situ and wherein said hydrocarbon molecule and said acrylic polymer are reacted in amounts so as to provide at least 1.0 moles of said hydrocarbon molecules per each mole of said acrylic polymer; and (B) ethylenically unsaturated monoisocyanates; wherein said adduct (A) and said monoisocyanates (B) are reacted in amounts so as to provide between about 0.1 and about 1.0 reactive isocyanates per each hydroxyl functionality present on said acrylic polymer-adduct (A).

2. A dispersion according to claim 1, wherein said reactive group of said hydrocarbon molecule is carboxyl and said pendant functionality of said acrylic polymer comprises epoxide and said hydrocarbon molecule has a number average molecular weight ($\overline{M}_n$) of between about 350 and about 3300.

3. A dispersion according to claim 2, wherein said long chain hydrocarbon molecule is capped poly(12-hydroxystearic acid) wherein the hydroxyl group of said poly(12-hydroxystearic acid) has been capped by reaction with an aliphatic carboxylic acid having a $C_3$–$C_{17}$ alkyl moiety.

4. A dispersion according to claim 1, wherein said acrylic polymer (b) contains pendant functionality selected from the group consisting of (i) epoxide, (ii) hydroxyl, and (iii) epoxide and hydroxyl.

5. A dispersion according to claim 4, wherein said acrylic polymer (b) is a copolymer bearing epoxide functionality and formed by reacting: (i) between about 3 and about 30 weight percent of one or more glycidyl esters of a monoethylenically unsaturated carboxylic acid and (ii) between about 70 and about 97 weight percent of other monoethylenically unsaturated monomers.

6. A dispersion according to claim 4, wherein said acrylic polymer (b) is a copolymer having pendant epoxide and hydroxyl functionality formed by reacting: (i) between about 2.5 and about 25 weight percent of one or more glycidyl esters of a monoethylenically unsaturated carboxylic acid, (ii) between about 0.5 and about 10 weight percent of one or more monoethylenically unsaturated monomers bearing hydroxyl functionality, and (iii) between about 65 and about 97 weight percent other monoethylenically unsaturated monomers.

7. A dispersion according to claim 1, wherein said unsaturated isocyanate is a monoethylenically unsaturated monoisocyanate having alpha-beta olefinic unsaturation.

8. A dispersion according to claim 1, wherein said acrylic polymer-adduct and said unsaturated monoisocyanate are reacted so as to provide between about 0.2 and about 0.8 reactive isocyanate groups per each hydroxyl functionality present on said adduct.

9. A dispersion according to claim 1, wherein the pairs of crosslinking functionalities of said first and second monomers used to form the dispersed polymer particles are selected from the group consisting of (a) hydroxyl and isocyanate; (b) acid and epoxide; (c) epoxide and amine; (d) hydroxy and amine (e) acid anhydride and amine; (f) acid anhydride and mercaptan; (g) hemiformal and amide; (h) carbonate and amine; (i) cycloimide and amine; (j) cycloimide and hydroxyl; and (k) imine alkoxysilane and (l) hydroxyl and acid anhydride.

10. A dispersion according to claim 9, wherein said dispersing liquid is an aliphatic hydrocarbon solvent and said first ethylenically unsaturated monomers (a) and said at least one other ethylenically unsaturated monomer (b) used in the preparation of said dispersed particle are acrylic monomers.

11. A dispersion according to claim 9, wherein said particles are formed by reactions comprising free radical addition copolymerization in the presence of hydrocarbon dispersing liquid of from about 25 to about 10 weight percent of monoethylenically unsaturated hydroxy monomer, from about 96 to about 80 weight percent of at least one other copolymerizable monoethylenically unsaturated monomer and from about 2 to about 10 weight percent of crosslinking monomer selected from the group consisting of amine-aldehyde resins.

12. A dispersion according to claim 11, wherein said monomers used in the addition copolymerization to form the dispersed polymer particles are characterized in that said ethylenically unsaturated hydroxy monomer is hydroxyethyl methacrylate, and said crosslinking monomer is isocyanatoethyl methacrylate.

13. A dispersion according to claim 3, wherein said acrylic copolymer contains functionalilty selected from the goup consisting of (a) epoxide, (b) epoxide and hydroxy and (c) hydroxyl.

14. Crosslinked polymer particles obtained by removal of said solvent from said dispersion formed in claim 1.

* * * * *